Jan. 16, 1945. G. C SULLIVAN 2,367,538
AIRCRAFT
Filed April 26, 1940
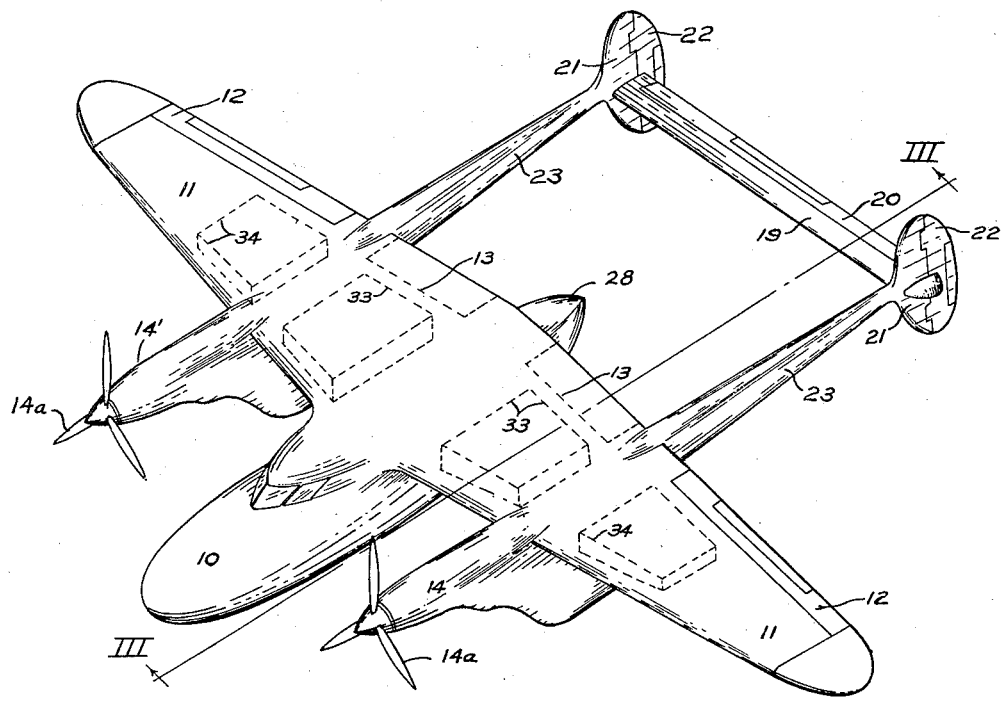
FIG-I
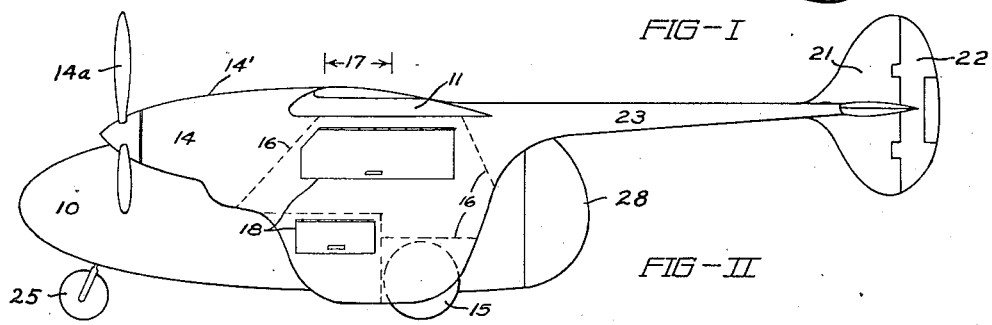
FIG-II
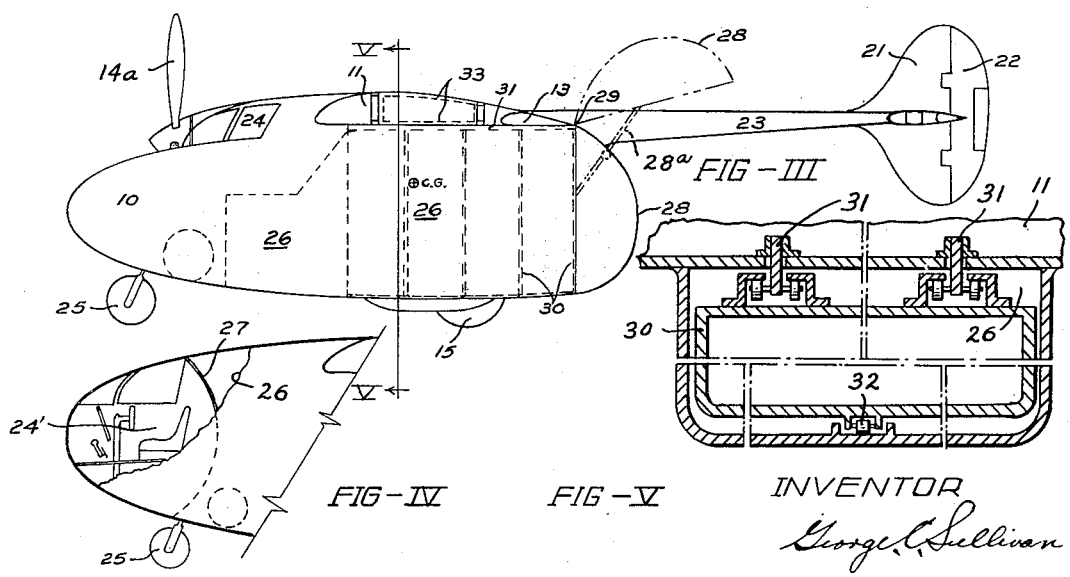
FIG-III
FIG-IV
FIG-V
INVENTOR
George C. Sullivan Patented Jan. 16, 1945

2,367,538

UNITED STATES PATENT OFFICE 2,367,538

AIRCRAFT

George C. Sullivan, Los Angeles, Calif., assignor to Lockheed Aircraft Corporation, Burbank, Calif.

Application April 26, 1940, Serial No. 331,805

6 Claims. (Cl. 244—137)

This invention relates to certain new and useful improvements in the design and construction of airplanes, particularly those adapted to the carrying of mail, air express or freight.

The commercial airplane of present design is required to carry both mail, air express and cargo in combination with passengers. It is my opinion that in the near future the carrying of cargo will be completely divorced from the carrying of passengers. To this end it is my belief that an aircraft must be designed and constructed strictly as a transport cargo aircraft. This invention relates to such a type.

The primary object of the invention is to devise an aircraft construction of the above character which is particularly adaptable to present day trends in aircraft design and construction; that is, the devising of a construction which will allow the loading and removing of mail, air express, freight, etc., hereinafter called "useful load" or "cargo," in an easy manner and still at the same time insure the proper distribution of the load. It is a further object of the invention to make use of certain space which is particularly adaptable to the carrying of cargo heretofore unknown in the art.

In the past, the various loads have been generally widely distributed with respect to the center of gravity of the aircraft and the stability has thus necessarily been sacrificed to a great degree. This fact was not too serious inasmuch as the individual loads were light and the plane could be balanced and trimmed sufficiently to care for such distribution, however, when an aircraft is designed primarily as a transport cargo aircraft, the loads will, in all probability be heavier and confined and concentrated into a smaller space. This concentration of load will require such to be distributed in a very efficient manner with respect to the center of gravity of the aircraft, that is, the final center of gravity must be confined within a certain limit, technically termed "center of gravity travel limits." Obviously, such travel limits are determined by balance computations, and represent loading conditions for safe flight stability. In present day design these limits usually occur between, say, 15% mean aerodynamic chord and 40% mean aerodynamic chord, both measured from the leading edge of such chord. The operators are required to load the aircraft in such a manner that the center of gravity will be confined between these limits.

Inasmuch as balancing the aircraft has a definite relationship with the position of the wing lift reaction, it has been found that the most efficient location for the carrying of useful load would be near the center of gravity travel limits. This invention has the advantage of disposition of the load not only near the desired resultant center of gravity of the aircraft but also allows the center of gravity to be located as low as possible with respect to the center of lift thus giving stability to the aircraft.

A tricycle type landing gear is preferred and is particularly adaptable to this invention, as it permits access to the rear of the fuselage which may be constructed low with respect to the ground thus permitting ease of loading and unloading the cargo. It will be understood that the invention is also applicable to seaplanes in which case the wheels will be eliminated and the landing gear substituted by pontoons of conventional construction.

In order to make my invention more clearly understood, I have shown in the accompanying drawing the invention illustrated in an aircraft designed along present day trends. The invention consists of the parts and combinations to be hereinafter set forth and claimed with the understanding that the several necessary elements comprising my invention may be varied in construction, proportions and arrangement without departing from the spirit and scope of the invention. It will be understood that my invention is applicable to many types of aircraft; and that for the purpose of this disclosure, I have merely selected a type of airplane to which it appears to be particularly applicable.

In the drawing:

Figure I is a perspective view of an aircraft constructed in accordance with the principles of my invention;

Figure II is a right side elevation of the aircraft shown in Figure I;

Figure III is a somewhat schematic sectional view taken on the line III—III of Figure I;

Figure IV is a schematic, sectional view of a modified fuselage showing an air-tight pressure compartment for the crew in the nose of the fuselage; and Figure V is a schematic fragmentary sectional view taken on the line V—V of Figure III.

The aircraft shown comprises a fuselage 10 preferably constructed along present day lines using light metal alloy. The wing 11 consists preferably in a conventional internally braced structure of metal with ailerons 12 and flaps 13. This design will allow a high wing loading inasmuch as safety requirements are not so severe as in aircraft carrying passengers.

The aircraft is propelled by means of propellers 14a driven by engines or power plants 14 well streamlined by means of cowlings 14'. The illustration in this case consists of two such power plants of the tractor type, however, it is to be understood that this invention is adapted to pusher type installation as well. These power plants are preferably designed so as to be aligned longitudinally with the main landing wheels 15. This design permits a construction which is well adapted to the carrying of cargo within a compartment outlined by lines 16 between the wing 11, the power plants 14 and the landing wheels 15. This compartment is particularly advantageous in that its center of gravity is located substantially within the desirable limits of center of gravity travel 17 as shown in detail by Figure II. The compartment 16 is preferably loaded and unloaded through openings and closures 18 in the side of the structure. Pitching and yawing control of the aircraft may be accomplished by means of a tail assembly or empennage which consists of a horizontal stabilizer 19 with its accompanying elevators 20 and vertical fins 21 with their accompanying rudders 22. The tail assembly is anchored to the aircraft by means of booms 23, such booms being preferably a continuation of the power plant-landing gear fairing which forms the structure and outlines the extremities of the compartment 16. It will be noted from Figure II that the fairing for the power plant and landing gear extends downwardly to a point lying in substantially the same horizontal plane as the bottom of the cargo compartment 26, and that the landing wheel 15 is partially enclosed thereby when in its landing position. A single boom leading from the wing 11 atop the fuselage 10 may obviously be used if desired.

The fuselage 10 consists principally in a pilot cabin 24, a retractable nose wheel 25 and cargo compartment 26. The nose portions of the fuselage 10 is particularly useful in carrying flares, radio and miscellaneous equipment. The fuselage 10 and the pilot's cabin 24 may be designed to normally travel at high altitudes. In such a case, the aircraft is equipped with an airtight compartment 24' for the crew, in which a pressure corresponding to the pressure of the atmosphere at ground level is substantially or attempted to be maintained. This arrangement is shown by Figure IV. The airtight compartment 24' is preferably pressurized by a supercharger connected to the power plants 14, the transmitting conduit passing from the power plant through the leading edge of the wing into the compartment 24'. A pressure bulkhead 27 separates the airtight compartment 24' from the cargo compartment 26, thus minimizing the load on the supercharger by minimizing the volume of compartment to be pressurized.

The compartment 26 is particularly adaptable to the carrying of bulk cargo, such cargo preferably being loaded from the rear end of the fuselage. The fairing or door 28 may be hinged along the top or side at 29 thus allowing it to be rotated into a position (shown in dot-and-dash lines in Fig. III) which will allow the cargo compartment 26 to be loaded easily. The door 28 is held in its open position by at least one collapsible brace 28a. The loading can be accomplished by means of trucks which can be wheeled into position, the cargo shifted from the trucks into the compartment 26 without resorting to hoisting means. The compartment 26 may be fitted, if desired, with individual cargo containers 30; such containers preferably being fitted into tracks 31 which are in turn attached to the wing structure 11 and held in place by guides 32. The containers may be locked into place for flight and unloaded and reloaded at the various flight stops. The compartment 26 is enclosed and streamlined by the cowling or fairing 28. Additional useful load compartments 33 may be installed in the wings 11 if desired, this feature being old in the art covering cargo type aircraft.

It is believed that the mail loads would be preferably carried in the cargo compartment 16 while the heavier bulkier loads would be carried in the fuselage compartment 26. In this way the useful load in compartment 26 may be played against the useful load in compartment 16 in order to keep the center of gravity within the travel limits. Any lateral unbalance due to loads in compartments 16 may be trimmed by use of aileron or aileron tabs, or differential flap action, if necessary.

The aircraft as disclosed is well designed in that the cargo compartment 26 is disposed centrally or medially of the aircraft and both forwardly and rearwardly relative to the leading and trailing edges, respectively, of the wings 11 so that the useful load is distributed laterally and longitudinally along the wing plan form, thus making for simplicity in construction and the saving of structural weight due to the lowering of wing moments and accompanying stresses. Gas tanks 34 are preferably installed in the outer wing sections, that is, to the outside of the booms 23 thus allowing for further simplicity and economics in the aircraft structure. This is a logical location for such gas loads as such are variable in weight and should therefore be near the center of gravity limits 17.

While I have illustrated this invention in connection with an aircraft having tail members for control mounted to the rear of the aircraft, it is to be understood that this invention is particularly adapted to an aircraft designed with horizontal tail members extending from the fuselage structure and forward of the main wing, similar to the commonly known "Cunard" type aircraft. It is also well adapted to the "flying wing" or "tailless" type of aircraft.

While I have shown and described the preferred embodiment of my invention I wish it to be understood that I do not confine myself to the precise details of construction herein set forth by way of illustration, as it is apparent that many changes and variations may be made therein by those skilled in the art without departing from the spirit of the invention or exceeding the scope of the appended claims.

I claim:

1. A cargo carrying airplane comprising a main body portion, having a cargo compartment therein, and having a loading door at the rear end thereof, wings attached to said main body portion, said wings having mounted thereon a pair of booms extending substantially parallel to the main body portion and to the rear thereof supporting the empennage, tricycle landing gear supporting the airplane so that the main body portion is supported in a substantially horizontal position and the empennage maintained in an elevated position whereby ample clearance is afforded for ready access to the unloading door.

2. A cargo carrying airplane, comprising: a main body portion having a cargo compartment formed therein and having a loading door at the rear end thereof; wings attached to said main body portion; a pair of booms extending from said wings and substantially parallel to the main body portion and to the rear thereof; an empennage supported by said booms; and landing gear supporting the airplane so that said main body portion is supported in a substantially horizontal position and said empennage is maintained in an elevated position, said landing gear including a pair of landing wheels depending from said wings and a landing wheel depending from said main body portion, whereby ample clearance is afforded for ready access to the loading door.

3. A cargo carrying airplane, comprising: a main body portion having a cargo compartment formed therein and having a loading door at the rear end thereof; wing means attached to said main body portion with said cargo compartment disposed below said wing means a pair of booms extending rearwardly from said wing means and substantially parallel to said main body portion; an empennage carried by said booms; and tricycle landing gear supporting the airplane so that said main body portion is supported in a substantially horizontal position and said empennage is maintained in an elevated position, whereby ample clearance is afforded for ready access to said loading door.

4. A cargo carrying airplane, comprising: a main body having a cargo compartment associated therewith and having a loading door at the rear end thereof providing access to said cargo compartment; wing means attached to the upper part of said main body portion with the cargo compartment below said wing means; a pair of booms, one on each side of said main body portion, extending horizontally rearwardly from said wing means and arranged substantially parallel to said main body portion; an empennage supported by said booms; and landing gear supporting the airplane so that said main body portion is supported in a substantially horizontal position and said empennage is maintained in an elevated position, said landing gear comprising a pair of wheels depending from said wing means and a nose wheel depending from said main body, whereby ample clearance is afforded for ready access to the loading door.

5. A cargo airplane of the high wing type comprising, wing means; a main body having a cargo compartment associated therewith, said cargo compartment having a loading door at the rear end thereof and being disposed below said wing means with portions thereof extending both forwardly and rearwardly of the leading and trailing edges of said wing means; a pair of booms, one on each side of said main body, extending rearwardly from said wing means and substantially parallel to said main body; an empennage supported by said booms; and tricycle landing gear supporting the airplane so that said main body portion is supported in a substantially horizontal position and said empennage is maintained in an elevated position, whereby ample clearance is afforded for ready access to the loading door.

6. A cargo airplane of the high wing type comprising, wing means; a main body having a cargo compartment associated therewith, said cargo compartment having a loading door at the rear end thereof and being disposed below said wing means with portions thereof extending both forwardly and rearwardly of the leading and trailing edges of said wing means; a pair of booms, one on each side of said main body, extending rearwardly from said wing means and substantially parallel to said main body; an empennage supported by said booms; and landing gear supporting the airplane so that the main body portion is supported in a substantially horizontal position and the empennage maintained in an elevated position, whereby ample clearance is afforded for ready access to the loading door, said landing gear including a pair of wheels depending from said wing means and a wheel depending from said main body.

GEORGE C. SULLIVAN.